(12) United States Patent
Brandt et al.

(10) Patent No.: US 11,260,644 B2
(45) Date of Patent: Mar. 1, 2022

(54) APPLICATOR FOR DIE-CUT PARTS AND METHOD FOR APPLYING DIE-CUT PARTS TO SURFACES, AND A DIE-CUT PART STRIP

(71) Applicant: tesa SE, Norderstedt (DE)

(72) Inventors: Hans-Peter Brandt, Schenefeld (DE); Matthias Seibert, Hamburg (DE)

(73) Assignee: tesa SE, Norderstedt (DE)

(*) Notice: Subject to any disclaimer, the term of this patent is extended or adjusted under 35 U.S.C. 154(b) by 0 days.

(21) Appl. No.: 16/457,651

(22) Filed: Jun. 28, 2019

(65) Prior Publication Data

US 2020/0001589 A1  Jan. 2, 2020

(30) Foreign Application Priority Data

Jun. 29, 2018 (DE) .................... 10 2018 210 746.7

(51) Int. Cl.
*B32B 38/04* (2006.01)
*B32B 7/12* (2006.01)
(Continued)

(52) U.S. Cl.
CPC ............... *B32B 38/04* (2013.01); *B32B 7/12* (2013.01); *B32B 37/0046* (2013.01); *B32B 37/1045* (2013.01); *B32B 37/12* (2013.01); *B32B 37/182* (2013.01); *B29C 66/9261* (2013.01); *B32B 37/06* (2013.01); *B32B 2041/06* (2013.01);
(Continued)

(58) Field of Classification Search
USPC ............... 156/352, 358, 361, 353; 83/72, 75
See application file for complete search history.

(56) References Cited

U.S. PATENT DOCUMENTS 1,909,841 A * 5/1933 Perryman ............. A61F 13/063
156/261
1,986,611 A 1/1935 Thomsen
(Continued)

FOREIGN PATENT DOCUMENTS

DE  1 953 552 U   1/1967
DE  197 41 385 A1  4/1998
(Continued)

OTHER PUBLICATIONS

Machine translation into English of DE1953552U, 2 pages, Bayer AG, Jan. 12, 1967. (Year: 1967).*
(Continued)

*Primary Examiner* — Linda L Gray
(74) *Attorney, Agent, or Firm* — McGuireWoods LLP (57) ABSTRACT

The invention relates to an applicator for die-cut parts (2), having a die-cut part strip (1) with a longitudinal direction (L) having a carrier layer (3) and an adhesive layer (4), where an outer contour of the die-cut parts (2) is punched through the carrier layer and adhesive layer (3, 4) down to predetertnined breaking points (18) and a die-cut part complement (19) protrudes beyond the die-cut parts (2) continuously laterally to a longitudinal direction (L), and a punch head (8) over which the die-cut part strip (1) runs, where the die-cut parts (2) running over the punch head (8) face away from the punch head (8) by their adhesive layer (4), and the die-cut parts (2) can be pressed by means of the punch head (8) onto a surface (11).

7 Claims, 3 Drawing Sheets

(51) Int. Cl.
*B32B 37/12* (2006.01)
*B32B 37/00* (2006.01)
*B32B 37/06* (2006.01)
*B32B 37/10* (2006.01)
*B32B 37/18* (2006.01)
*B32B 41/00* (2006.01)
*B29C 65/00* (2006.01)

(52) U.S. Cl.
CPC ....... *B32B 2519/00* (2013.01); *Y10T 156/107* (2015.01); *Y10T 156/1075* (2015.01); *Y10T 156/1085* (2015.01)

(56) References Cited

U.S. PATENT DOCUMENTS 6,145,423 A * 11/2000 Boreali ................ B65C 9/1803
83/145
8,365,788 B2 2/2013 Le

FOREIGN PATENT DOCUMENTS

| GA | 860 753 A | 1/1971 |
|----|-----------|--------|
| JP | S55-135 623 A | 10/1980 |
| JP | S60-2 429 A | 1/1985 |
| JP | H11-348 950 A | 12/1999 |

OTHER PUBLICATIONS

Machine translation into English of DE19741385A1, 4 pages, Mayer William J, Apr. 2, 1998. (Year: 1998).*
Machine translation into English of JPH11348950A, 6 pages, Itagaki Ryuji, Dec. 21, 1999. (Year: 1999).*
Machine translation into English of JPS602429, 3 pages, Ogata Toshio, Jan. 8, 1985. (Year: 1985).*
Machine translation in English of JPS55135623, 2 pages, Taniguchi Youkichi, Oct. 22, 1980. (Year: 1980).*
German Examination Notice dated Mar. 7, 2019, issued in German Application No. 10 2018 210 746.
Hansen et al., Solubility Parameters in Practice, eBook, Nov. 2015, 5th Edition, http://www.pirika.com/ENG/HSP/E-Book/index.html.
Hansen, Hansen Solubility Parameters: A User's Handbook, Book, 2007, Second Edition, SCRC Press, Boca Raton, USA.

* cited by examiner

Fig.5

APPLICATOR FOR DIE-CUT PARTS AND METHOD FOR APPLYING DIE-CUT PARTS TO SURFACES, AND A DIE-CUT PART STRIP

TECHNICAL FIELD

The invention relates to an applicator for die-cut parts with a die-cut part strip having a carrier layer and an adhesive layer. The invention also relates to a method for applying die-cut parts to a surface. The invention also relates to a die-cut part strip having a carrier layer and an adhesive layer.

BACKGROUND

A frequent problem arising in the production of motor vehicles is that openings that have been made in bodywork parts have to be bonded closed again after processing operations. For example, bodywork parts may be surface-treated with liquid. The liquid needed for the surface treatment runs off automatically via openings made beforehand in the bodywork parts. Subsequently, the openings are closed again. Frequently, the openings are closed by hand, by taking die-cut parts from a die-cut part strip or a die-cut part sheet and adhering them by hand onto the openings. The die-cut parts have a carrier layer and an adhesive layer applied on one side of the carrier layer. The adhesive layer is generally applied over the full area of the carrier layer.

In the prior art, furthermore, robot arms are known. For this purpose, a die-cut part roll is provided, with a die-cut part strip conventionally wound on said roll. The die-cut part strip is generally a liner present in tape form. On this liner, spaced apart from one another in a row, die-cut parts with carrier layer and adhesive layer are applied in such a way that the free side of the adhesive layer is adhered on the liner, so that the side of the adhesive layer opposite the liner is covered by the carrier layer, so that the adhesive is fully protected. The die-cut part strip can then be wound up, specifically in such a way that the liner is disposed on the outside of a turn and the die-cut parts on the inside of a turn on a die-cut part roll. Conventionally, the free end of the die-cut part strip is drawn off and clamped into an apparatus, and a robot arm draws the die-cut parts off from the die-cut part strip in succession, by suction. For this purpose, the robot arm has a trunk-like design and attaches by suction the die-cut part to the carrier layer, detaches it from the liner, and presses the die-cut part onto the opening in the mandated position.

Disadvantageously, this process is relatively time-consuming, since the robot arm has to be moved back to the die-cut part roll again after each bonding operation, in order to detach the next die-cut part from the die-cut part strip.

Furthermore, applicators in the form of label dispensers are known. In this case, the label dispenser is disposed on a robot arm. The label dispenser has the die-cut part roll. The die-cut part roll is guided to a press roll and the liner is automatically stripped off, and the die-cut part is pressed onto the hole by displacement of the label dispenser with the aid of the press roll. Disadvantageously, this process has a fairly large footprint, since the label dispenser has to be drawn over a certain distance by means of the robot arm. This is disadvantageous, for example, in regions of an automotive panel that are difficult to access, as for example if the opening requiring closure is sited directly adjacent to a highly curved edge.

SUMMARY OF THE INVENTION

In a first aspect, it is an object of the present invention, therefore, to provide an applicator which reduces the disadvantages identified above.

In a second aspect, it is an object of the invention to provide a method with which die-cut parts can be adhered and the above-stated disadvantages are avoided.

In a third aspect, it is also an object of the invention to provide a die-cut part strip with which the above-stated method can be carried out.

In respect of the applicator, the object is achieved by an applicator stated at the outset with the features of Claim 1.

The applicator of the invention for die-cut parts comprises a die-cut part strip with a longitudinal direction and die-cut parts applied preferably at a distance from one another along the longitudinal direction. The die-cut part strip has a carrier layer and an adhesive layer, where an outer contour of the die-cut parts is punched through the carrier layer and the adhesive layer down to predetermined breaking points. The predetermined breaking points are located preferably in the carrier layer, more preferably only in the carrier layer.

In accordance with the invention, a die-cut part complement protrudes beyond the die-cut parts continuously laterally—i.e. perpendicularly—to the longitudinal direction. After the die-cut parts have been removed, the die-cut part complement forms a punched strip which is held together at the sections protruding laterally. The sections are chosen to be wide enough to have adequate tear strength, to allow the die-cut part strip to be unwound from a die-cut part strip roll by pulling on one end of the punched strip.

The applicator of the invention comprises a punch having a punch head, over which the die-cut part strip runs, with the die-cut part strip running over the punch head being disposed facing away from the punch head by its adhesive layer. The die-cut parts of the invention, relative to the prior art, are therefore arranged, so to speak, rotated by 180° about the longitudinal direction. As a result it is possible that the die-cut parts can be pressed by means of a punch onto a surface and can be removed by tearing of the predetermined breaking points. As a result of the onward conveying of the die-cut part strip and/or punched strip, the next die-cut part is brought into the position of the punch.

There is preferably a control system provided. The control system comprises a first sensor, which with a scanning region is directed at the punch head and registers the presence of a die-cut part at the punch head. This may be effected, for example, by a coloured control mark; however, other recording possibilities are also conceivable. The control system is signal-conductingly connected to the sensor, and sensor measurements are supplied to the control system. According to one particularly preferred variant, the applicator is secured on a freely movable robot arm. The robot aim controls, firstly, a back-and-forward movement of the applicator in the z-direction, perpendicular to the surface, and secondly controls a movement in an xy-plane parallel to the surface. The robot arm is capable of responding accordingly to the control signals.

Furthermore, the cycled propulsion of the die-cut part strip is controlled, allowing the subsequent die-cut part to be positioned on the punch head. The propulsion of the die-cut part strip may take the form of a driven first winding roller for the punched strip.

When the first sensor signals the presence of a die-cut part at the punch head and passes a corresponding measurement to the control system, the propulsion of the die-cut part strip is halted and a signal is supplied to the robot, and the robot moves the applicator together with punch head towards the surface in a forward movement and back from the surface in a back movement. The extent of the forward movement is such that the die-cut part adheres on the surface. For this purpose, a corresponding pressure sensor may be arranged on the punch, this sensor registering the pressure resistance by the surface. The punch head and the die-cut part are preferably identical in their outer contour, so that in fact only or primarily the die-cut part and not the die-cut part complement is pressed onto the surface and a pressure-sensitive adhesive bond produced there.

By the forward movement of the punch head and/or by onward conveying of the die-cut part strip, the predetermined breaking points break open, and the die-cut part parts from the die-cut part strip, leaving behind the punched strip as the die-cut part complement.

So that the applicator is brought from the first position to the next position, the control system is preferably programmed with an opening pattern or adhesive-bonding pattern in the robot control. The control system may for this purpose be designed as an NC controller. It is also conceivable for a second sensor to be provided, registering the holes as it runs over the surface. A combination of NC controller and sensor technology may also be provided.

Favourably, the control system activates the robot, which moves the applicator together with punch head into a first position above the surface and adheres the die-cut part at a first surface position. After the adhering of the die-cut part, it activates the robot again and moves the applicator together with punch head in the xy-plane into a second position above the surface; there, the next die-cut part is adhered, through a forward motion in z-direction, onto the next opening.

Favourably, a die-cut part roll is provided on a supply side of the punch head, and a first winding roller on a removal side of the punch head. The first winding roller is signal-conductingly connected to the control system, and this roller is able to receive, in wound form, the punched strip. The control system rotates the first winding roller cyclically. The advance distance in one cycle here corresponds in each case to the distance between adjacent die-cut parts in the die-cut part strip.

In another preferred embodiment of the invention, a second winding roller is provided on the supply side, to wind up a liner. The free adhesive side of the die-cut part strip may optionally be covered with a liner. In that case the liner on the second winding roller must be peeled off on the supply side before the die-cut part is supplied to the punch head.

The object is also achieved by an aforementioned method having the features of claim 6.

The method is suitable for implementation with one of the abovementioned applicators; conversely, the applicators are also suitable for implementing one of the following methods.

In accordance with the invention, a die-cut part strip with a longitudinal direction and with a carrier layer and an adhesive layer runs over a punch head of a punch, where an outer contour of the die-cut parts is punched through the carrier layer and adhesive layer down to predetermined breaking points, and a die-cut part complement protrudes beyond the die-cut parts continuously laterally to the longitudinal direction.

In accordance with the invention, the die-cut part strip is halted when a die-cut part is positioned over the punch head, and the punch is then moved by means of a robotic aim on the surface, in a forward movement, and the die-cut part is stuck to the surface. During the forward movement, the die-cut part strip is advanced a little, so that the die-cut part does not slip from the punch head. A pressing face or at least outer contour of the punch head is identical to the die-cut part.

Similarly, during the back movement, the die-cut part strip is likewise held tautly by advancement of the die-cut part strip. As a result of the forward movement, the predetermined breaking points are broken open. It is also conceivable for the die-cut part strip initially or simultaneously to be conveyed onward a little, and for the predetermined breaking points to break open as a result of this. The peel adhesion of the adhesive layer on the surface and the tear strength of the predetermined breaking points are harmonized with one another accordingly.

The method of the invention makes it possible, in a simple way, to position die-cut parts on a surface, more particularly on openings; the die-cut part here is of course selected to have a diameter somewhat greater than the opening, producing an adhesive margin. Of course, the die-cut parts may also be bonded at positions other than on openings, as well.

Because of the back-and-forward movement of the punch head in the z-direction, only very little space is needed in the xy-plane to apply a die-cut part to a surface. This is an advantage relative to the known label dispensers.

Furthermore, it is preferably possible for a first position to be determined on the surface, for the die-cut part to be stuck to the first position, and for a second position to be determined and for the punch to be moved to the second position during the onward cycling of the die-cut part strip. With preference, the next die-cut part is already disposed on the die-cut part head again when the punch has reached its envisaged second position. This is a considerable time saving relative to the known robot arm.

With preference, a first sensor may be directed at the punch head and is able to recognize the presence of the die-cut part. When the die-cut part is recognized, the die-cut part strip is halted, and, when the punch has reached its position above the surface, the punch is moved to the surface, the die-cut part is adhered, and the die-cut part strip is cycled on by one die-cut part. The robotic arm is designed for displacing the applicator in the xy-plane parallel to the surface, while the back-and-forward movement of the punch takes place in z-direction.

The control system also controls the speed and the angle of rotation of a winding roller on which the punched strip is wound and also, optionally, the speed and the rotational angle of a second winding roller, on which an optional liner can be wound.

The invention is achieved, in a third aspect, by means of a die-cut part strip having the features of Claim 10.

The die-cut part strip of the invention has a longitudinal direction and a carrier layer and an adhesive layer, where an outer contour of the die-cut parts is punched through the carrier layer and adhesive layer down to predetermined breaking points, and a die-cut part complement protrudes beyond the die-cut parts continuously laterally to the longitudinal direction. The die-cut part complement is a continuous punched strip. The adhesive layer is preferably punched through completely along the outer contour of the die-cut part, and the predetermined breaking points are present only in the carrier layer. In that case the die-cut part strip can be unrolled and conveyed by pulling on the carrier layer.

Relative to the known die-cut part strips, the die-cut parts are arranged, so to speak, rotated by 180° about the longitudinal direction. The adhesive layer lies freely and can be adhered to a surface by pressing on the die-cut part, and the die-cut part complement can then be detached from the die-cut part by the predetermined breaking points breaking open. For this purpose, the release force between the adhesive layer and the surface to which bonding is to take place is preferably selected to be greater than the tensile strength of the predeteiminecl breaking point holding the die-cut part.

In another embodiment of the die-cut part strip of the invention, there is a liner present which is arranged along the adhesive layer and covers the free sides of the adhesive layers of the die-cut parts. The die-cut part strip may be wound up with the carrier layer, the adhesive layer and the liner to form the die-cut part roll. In both embodiments of the die-cut part strip, the wound-up die-cut part strip is wound with the carrier layer on the inside of the turn and with the adhesive layer on the outside of the turn.

BRIEF DESCRIPTION OF THE DRAWINGS

The invention is described with reference to two exemplary embodiments in four figures. In these figures.

DETAILED DESCRIPTION

Figure 1:
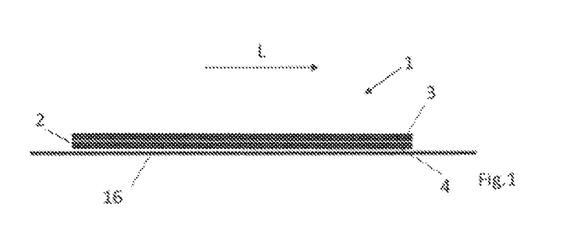
FIG. 1 shows a basic side view of a die-cut part strip of the invention.

A die-cut part strip 1 shown in FIG. 1 has die-cut parts 2 which are arranged in a row and are spaced apart from one another. The spacing of the die-cut parts 2 from one another is guided by the particular application; it may be 1 mm, 2 mm, 3 mm to 6 mm, or 7 mm. All values in between are disclosed as well. The die-cut parts 2 are disposed along a longitudinal direction L in the die-cut part strip.

The die-cut part strip 1 comprises a carrier layer 3 and an adhesive layer 4. The carrier layer 3 consists of customary plastics; by way of example, but without limitation, mention may be made of the following:

polyethylene, polypropylene—especially the oriented polypropylene (OPP) generated by monoaxial or biaxial drawing, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

The adhesive layer 4 consists of a customary pressure-sensitive adhesive. The pressure-sensitive adhesive comprises a basis and a crosslinkable component, also referred to as reactive resin.

There are various materials, particularly non-polar elastomers, which are a suitable basis for pressure-sensitive adhesives.

Non-polar elastomers, such as vinylaromatic block copolymers, for example, are notable in that they can be dissolved in non-polar solvents—that is, in solvents and/or solvent mixtures whose polarity corresponds to ethyl acetate or which are less polar. These are, in particular, solvents and/or solvent mixtures having a dielectric constant of less than 6.1 [http://en.wikipedia.org/wiki/Solvent] and/or having Hansen parameters δP polar≤5.3; δH hydrogen bonding≤7.2 [Abbott, Steven and Hansen, Charles M. (2008) Hansen Solubility Parameters in Practice, ISBN 0-9551220-2-3 or Hansen, Charles M. (2007) Hansen solubility parameters: a user's handbook CRC Press, ISBN 0-8493-7248-8].

Where block copolymers are employed as elastomers, they contain at least one kind of block having a softening temperature of greater than 40° C. such as, for example, vinylaromatics (including partially or fully hydrogenated variants), methyl methacrylate, cyclohexyl methacrylate, isobornyl methacrylate and isobornyl acrylate.

With further preference, the block copolymer comprises a kind of block having a softening temperature of less than −20° C.

Examples of polymer blocks having low softening temperatures ("soft blocks") are polyethers such as, for example, polyethylene glycol, polypropylene glycol or polytetrahydrofuran, polydienes such as, for example, polybutadiene or polyisoprene, (partially) hydrogenated polydienes such as, for example, polyethylene-butylene, polyethylene-propylene or polybutylene-butadiene, polybutylene, polyisobutylene, polyalkyl vinyl ethers, and polymer blocks of α,β-unsaturated esters such as, in particular, acrylate copolymers.

In one version, the soft block here has a non-polar construction and in that case preferably comprises butylene or isobutylene or hydrogenated polydienes as homopolymer block or copolymer block, the latter preferably copolymerized with itself or with one another or with further comonomers which with particular preference are non-polar comonomers. Examples of suitable non-polar comonomers are (partially) hydrogenated polybutadiene, (partially) hydrogenated polyisoprene and/or polyolefins.

The crosslinkable component, also referred to as reactive resin, consists of a cyclic ether and is suitable for radiation crosslinking and optionally thermal crosslinking, with a softening temperature of less than 40° C., preferably of less than 20° C.

The reactive resins based on cyclic ethers are, more particularly, epoxides, namely compounds which carry at least one oxirane group, or oxetanes. They may be aromatic or, in particular, aliphatic or cycloaliphatic in nature.

Reactive resins that can be used may be monofunctional, difunctional, trifunctional, tetrafunctional or of higher functionality, up to being polyfunctional, with the functionality referring to the cyclic ether group.

Examples, without wishing to impose any limitation, are 3,4-epoxycyclohexylmethyl 3',4'-epoxycyclohexanecarboxylate (EEC) and derivates, dicyclopentadiene dioxide and derivates, 3-ethyl-3-oxetanemethanol and derivates, diglycidyl tetrahydrophthalate and derivatives, diglycidyl hexahydrophthalate and derivatives, ethane 1,2-diglycidyl ether and derivatives, propane 1,3-diglycidyl ether and derivatives, butane-1,4-diol diglycidyl ether and derivatives, higher alkane 1, n-diglycidyl ethers and derivatives, bis[(3,4-epoxycyclohexyl)methyl] adipate and derivatives, vinylcyclohexyl dioxide and derivatives, 1,4-cyclohexanedimethanol bis(3,4-epoxycyclohexanecarboxylate) and derivates, diglycidyl 4,5-epoxytetrahydrophthalate and derivatives, bis[1-ethyl(3-oxetanyl)methyl] ether and derivatives, pentaerythritol tetraglycidyl ether and derivates, bisphenol A diglycidyl ether (DGEBA), hydrogenated bisphenol A diglycidyl ether, bisphenol F diglycidyl ether, hydrogenated bisphenol F diglycidyl ether, epoxyphenol novolaks, hydrogenated epoxyphenol novolaks, epoxycresol novolaks, hydrogenated epoxycresol novolaks, 2-(7-oxabicyclo)spiro

[1,3-dioxane-5,3'-[7]oxabicyclo[4.1.0]heptane], 1,4-bis((2,3-epoxypropoxy)methyl)cyclohexanes.

Reactive resins may be used in their monomeric form or else dimeric, trimeric form, etc., up to their oligomeric form.

Mixtures of reactive resins with one another, or else with other co-reactive compounds such as alcohols (monofunctional or polyfunctional) or vinyl ethers (monofunctional or polyfunctional), are likewise possible.

The adhesive layer 4 is applied over the full area of one side of the carrier layer 3. The adhesive layer 4 is covered over its full area with a liner 16. The liner 16 masks the free adhesive side of the adhesive layer 4, so protecting it from contamination and the like. Furthermore, the winding of the die-cut part strip 1 into a die-cut part roll 7, and subsequent unwinding, are made easier.

Figure 2:
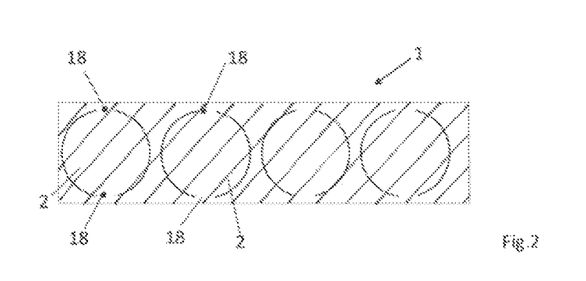
FIG. 2 shows a basic plan view of the die-cut part strip in FIG. 1.

According to FIG. 2, the die-cut pans 2 in their outer contour are punched down to predetermined breaking points 18 through the carrier layer 3 and the adhesive layer 4. The predetermined breaking points 18 may be present both in the carrier layer 3 and in the adhesive layer 4. The predetermined breaking points 18 may be arranged perpendicularly to the longitudinal direction L, laterally on the die-cut parts as in FIG. 2, or else in longitudinal direction L at the front and back on the die-cut parts 2, or both, or else in another way.

Figure 3:
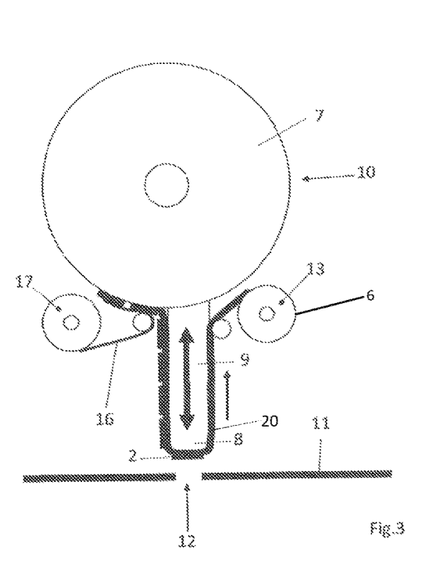
FIG. 3 shows a basic side view of an applicator of the invention for the die-cut part strip in a first embodiment.
Figure 4:
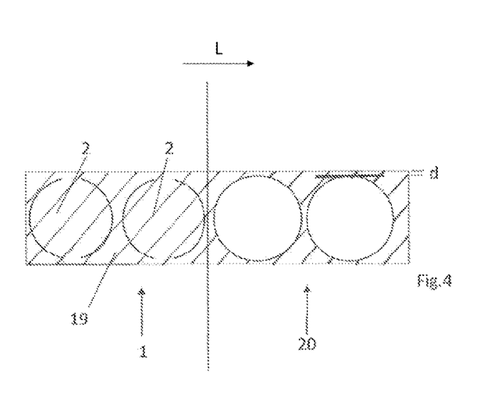
FIG. 4 shows a basic plan view of the die-cut part strip after tearing out die-cut parts.

The die-cut part strip 1 according to FIG. 1 is initially wound on the die-cut part roll 7 according to FIG. 3. One end of the die-cut part strip 1 is parted from the die-cut part roll 7 and placed, according to FIG. 3, around a punch head 8 of a punch 9. The die-cut part roll 7 is placed onto a peg, which is not shown in detail, and is rotatably mounted on said peg. FIG. 3 shows merely the basic construction of an applicator 10 of the invention in a first embodiment. The applicator 10 in the first embodiment is suitable for die-cut part strips 1 having a liner 16.

The applicator 10 has a second winding roller 17, which is disposed on a feed side of the punch head 8, whereas a first winding roller 13 is disposed on the removal side of the punch head 8. The second winding roller 17 first rolls up the liner 16 on the feed side of the punch head 8, so that the adhesive layer 4 of the die-cut parts 2 is exposed, and then, according to FIG. 3, the die-cut part strip 1 freed from the liner 16 can be guided around the punch head 8.

To guide the die-cut part strip 1, additionally, there are also deflection rollers and the like provided, which are not shown in the drawing in FIG. 2. Starting from the die-cut part roll 7, the die-cut part strip 1 is guided around the punch 9, and more particularly around the punch head 8. In application, the applicator 10 is movable back and forward by means of the flange-connected robotic arm of a robot. The surface is shown in FIG. 3 with an opening 12. The applicator 10 of the invention is intended to stick one of the die-cut parts 2 to the opening 12, and so to close the opening 12.

The openings 12 customarily have a circular or oval opening cross section with a diameter of approximately 20 mm. The die-cut parts 2 therefore have a circular diameter of approximately 30 mm, thus forming an adhesive margin 5 mm wide around the opening 12. The advance distance of the die-cut part strip 1 is provided by the driven first winding roller 13.

The first winding roller 13 winds only one retaining belt 6, after the die-cut parts 2 have been successively adhered, in other words without the die-cut parts 2.

A control system is provided which rotates the first winding roller 13 cyclically at an angle which corresponds to the spacing of the die-cut parts 2 from one another, so that for each bonding operation there is exactly one of the die-cut parts 2 positioned on the punch head 8. In a bonding position, which is shown in FIG. 2, the die-cut part 2 is disposed on the punch head 8. In this state, it can be stuck onto the opening 12 by forward movement of the applicator 10.

Control of the applicator 10 operates as follows: A first sensor is provided, which is directed at the punch head 8 and which registers the presence of the die-cut part 2 on the punch head 8. This may be effected, for example, by a coloured control mark; however, other recording possibilities are also conceivable. When the die-cut part 2 is present, the first sensor delivers a signal to the control system, which delivers a halt signal to a drive of the first winding roller 13. The rotary movement of the first winding roller 13 is halted. The applicator 10 is pressed by a flange-connected robot and therefore the die-cut part 2 is pressed onto the opening 12. The applicator 10 is subsequently raised again and, coordinated by the control system, the first winding roller 13 is rotated a little, so that the die-cut part strip 1 does not hang loosely over the punch head 8, which is pulled in. This causes the die-cut part 2 to break away from a die-cut part complement 19 at the predetermined breaking points 18.

The first winding roller 13 is then rotated further, so that the next die-cut part 2 is positioned on the retracted punch head 8. During the further transport of the die-cut part strip 1, the drive moves the entire applicator 10 from a position above the opening 12 shown in FIG. 2 into a subsequent position, in which the punch head 8 is positioned over the next opening 12. Either a second sensor may be provided, which registers the next opening 12 and delivers a signal to the control system, which halts the drive, so that the applicator 10 stops in the next position over the surface 11, or the opening pattern of the surface 11 is stored in the control system of the robotic aim, so that the applicator 10 traverses the openings 12 one after another.

The punch head 8 has a pressing face which is identical to the outer contour of the die-cut part 2, so that only the die-cut part 2 is bonded onto the surface 11. As a result of the forward movement of the punch head 8, the predetermined breaking points 18 tear open, because the peel adhesion of the die-cut part 2 on the surface 11 is greater than the tensile strength of the predetermined breaking points 18 of the die-cut part 2. After the die-cut part 2 has been torn out, there remains, as a die-cut part complement 19, a punched strip 20, which is wound up on the first winding roller 13. The carrier layer 3 protrudes beyond the die-cut part 2 laterally, perpendicularly to the longitudinal direction L, by a width d, which is made such that the die-cut part strip 1 can be peeled from the die-cut part roll 7 by means of pulling force exerted on the end of the punched strip 20, without tearing.

The liner 16 is wound on the second winding roller 17, and the punched strip 20 is wound on the first winding roller 13, and the liner 16 and the punched strip 20 can be supplied for recycling.

Figure 5:
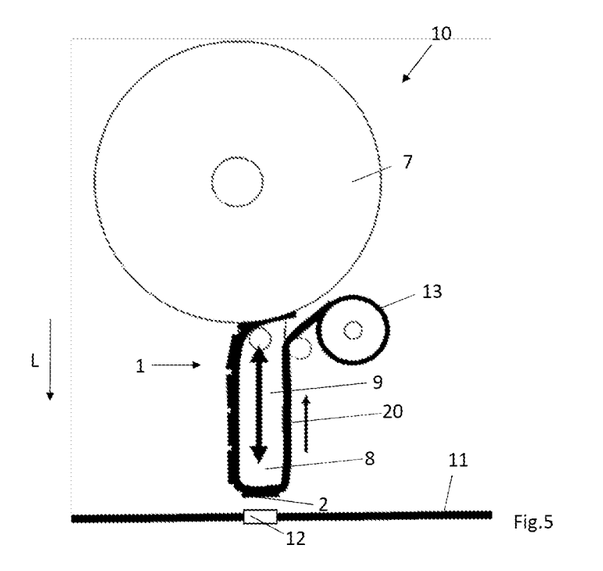
FIG. 5 shows a basic side view of an applicator of the invention for the die-cut part strip in a second embodiment.

FIG. 5 shows a theoretical side view of an applicator 10 of the invention in a second embodiment. The second embodiment of the applicator 10 is intended to apply die-cut parts 2 from a die-cut part strip 1 that has no liner 16. The applicator 10 has the die-cut part roll 7, which, however, relative to the die-cut part roll 7 of the first embodiment in FIG. 3 unwinds the other way round, clockwise in FIG. 5. The die-cut part strip 1 is wound on the die-cut part roll 7; the die-cut part strip 1 has a carrier layer 3 and also, arranged at a distance from one another in the longitudinal direction L along the carrier layer 3, it has die-cut parts 2. On their side facing away from the carrier layer 3, the die-cut parts 2 have an adhesive layer 4. The adhesive layer 4, however, is not masked by a liner 16, but instead lies freely, and the die-cut part strip is wound up with the exposed adhesive layer to form the die-cut part roll 7. Here, the peel adhesion of the adhesive layer 4 is made such that the die-cut part strip 1 can be easily unwound from the die-cut part roll 7 by pulling on the free end of the die-cut part strip 1. The free end of the die-cut part strip 1 is guided around the punch head 8 as in the first embodiment. In the case of the second embodiment of the applicator 10, the second winding roller 17 for winding the liner 16 is no longer necessary. The function of the applicator 10, with regard to applying the die-cut part 2 to the opening 12, is exactly the same as that of the applicator 10 of the first embodiment. The disclosure in relation to the above figures is also valid, accordingly, for FIG. 5. By driven rotation of the first winding roller 13, the die-cut part strip 1 is pulled on the carrier layer 3, and the die-cut part strip 1 is positioned over the opening 12 in such a way that a die-cut part 2 is positioned exactly on the carrier head 8. The applicator 10 is then pressed onto the opening 12, in a movement of the robotic arm (not shown in the drawing) on which the applicator 10 is arranged, and, by virtue of the peel adhesion of the adhesive layer 4 of the die-cut part 2 along the opening edge, the die-cut part 2 tears, away from the surface 11 as the applicator 10 moves on, out of the die-cut part strip 1. The punched strip 20 which forms is wound on the first winding roller 13. The punched strip 20 on the first winding roller has the same design as the punched strip 20 on the first winding roller 13 of the first embodiment. By virtue of the winding of the punched strip 20, the die-cut part strip 1 receives its indexed advance, and the next die-cut part 2 is positioned on the punch head 8.

LIST OF REFERENCE SYMBOLS 1 die-cut part strip
2 die-cut part
3 carrier layer
4 adhesive layer
6 retaining belt
7 die-cut part roll
8 punch head
9 punch
10 applicator
11 surface
12 opening
13 first winding roller
16 liner
17 second winding roller
18 predetermined breaking point
19 die-cut part complement
20 punched strip
d width
L longitudinal direction

The invention claimed is:

1. An applicator for die-cut parts comprising:
a die-cut part strip having a longitudinal direction and comprising die-cut parts, a die-cut part complement, a carrier layer, and an adhesive layer; wherein an outer contour of the die-cut parts is punched through the carrier layer and adhesive layer down to predetermined breaking points; wherein the die-cut part complement protrudes beyond the die-cut parts continuously laterally in the longitudinal direction; and
a punch comprising a punch head over which the die-cut part strip runs, wherein the adhesive layer of the die-cut parts faces away from the punch head as the die-cut parts run over the punch head, and wherein the die-cut parts are configured to be pressed by means of the punch head onto a surface; and
a control system signal-conductingly connected to a first sensor comprising a scanning region directed at the punch head; wherein the first sensor is configured to register the presence of one of the die-cut parts at the punch head; wherein the control system further comprises a robotic arm on which the applicator is disposed; wherein the control system is further configured to halt a first winding roller of the die-cut part strip when one of the die-cut parts is registered at the punch head; wherein the control system is further configured to then drive a forward movement and a back movement of the robotic arm with the applicator.

2. The applicator of claim 1, wherein the control system is configured to activate the robotic arm and move the punch head into a first position above the surface and adhere the die-cut part in a first surface position and, after the adhering of the die-cut part, the control system is further configured to activate the robotic arm and move the punch head into a second position above the surface, where it drives a forward movement and a back movement of the applicator.

3. The applicator of claim 1, further comprising a die-cut part roll on a supply side of the punch head; wherein the applicator further comprises the first winding roller on a removal side of the punch head; wherein the first winding roller is signal-conductingly connected to the control system; wherein the first winding roller is configured to accept a winding of a punched strip formed by the removal of the die-cut parts from the die-cut part strip; and wherein the first winding roller is further configured to move the die-cut part strip cyclically onward.

4. The applicator of claim 3, wherein the die-cut parts strip further comprises a liner covering the adhesive layer; and wherein the applicator further comprises a second winding roller at the supply side for accepting a winding of the liner.

5. A method for applying die-cut parts to a surface, the method comprising:
providing an applicator comprising:
a die-cut part strip having a longitudinal direction and comprising die-cut parts, a die-cut complement, a carrier layer, and an adhesive layer; wherein the die-cut part complement protrudes beyond the die-cut parts continuously laterally to the longitudinal direction;
a punch comprising a punch head over which the die-cut part strip runs, wherein the adhesive layer of the die-cut parts faces away from the punch head as the die-cut parts run over the punch head, and wherein the die-cut parts are configured to be pressed by means of the punch head onto a surface;
a control system signal-conductingly connected to a first sensor comprising a scanning region directed at the punch head; wherein the first sensor is configured to register the presence of one of the die-cut parts at the punch head; wherein the control system further comprises a robotic arm on which the applicator is disposed; wherein the control system is further configured to halt a first winding roller of the die-cut part strip when one of the die-cut parts is registered at the punch head; wherein the control system is further configured to then drive a forward movement and a back movement of the robotic arm with the applicator, running the die-cut strip over the punch head, halting the die-cut part strip when one of the die-cut parts is positioned over the punch head, punching an outer contour of the die-cut parts through the carrier layer and adhesive layer down to predetermined breaking points, and then sticking one of the die-cut parts onto the surface.

6. The method of claim 5, wherein when the first sensor registers the presence of one of the die cut parts at the punch head then the die-cut part strip is halted and then the punch is moved to the surface and adheres the die-cut part, and then the die-cut part strip is cycled to a next die-cut part.

7. The method of claim 5, wherein a first position on the surface is determined and the die-cut part is stuck to the first position, wherein then a second position on the surface is determined and the punch is moved to the second position.

* * * * *